United States Patent Office 3,351,581
Patented Nov. 7, 1967

3,351,581
ACETYL ALGINATES AND PECTATES AND
PROCESS OF MAKING THE SAME
Richard G. Schweiger, San Diego, Calif., assignor to
Kelco Company, San Diego, Calif., a corporation
of Delaware
No Drawing. Filed June 24, 1966, Ser. No. 560,065
22 Claims. (Cl. 260—209.5)

ABSTRACT OF THE DISCLOSURE

Acetyl alginate, acetylated propylene glycol alginate, and salts thereof, which form gels in aqueous solution when contacted with a $Cu^{++}$, $Pb^{++}$, $Fe^{+++}$ or $Al^{+++}$ ion. A process for acetylating alginic acid and propylene glycol alginate in a reaction system consisting essentially of acetic anhydride, and optionally acetic acid, on the addition of perchloric acid. Process for esterifying pectic acid with lower fatty organic acids in which the pectic acid is hydrated, then partially dehydrated by washing with an organic solvent which is miscible with water, and then reacted with the anhydride of the lower fatty organic acid in the presence of perchloric acid or sulfuric acid and optionally acetic acid.

---

This patent application is a continuation-in-part of my prior copending application, Ser. No. 113,082, filed May 29, 1961, and now abandoned entitled "Algin Acetates and Process of Making the Same," and Ser. No. 291,285, filed June 28, 1963, and now abandoned, entitled, "Acetyl Pectates and Process of Preparing Same."

This invention relates to acetylated alginic acid and acetylated pectic acid, i.e., align acetates and acetyl pectates. This invention also relates to esters of pectic acid with organic acids and, more specifically, to acetyl, propionyl, and butyryl pectic acid and salts thereof. Still further, this invention relates to esters of essentially undegraded alginic acid, salts thereof, and derivatives of esters of essentially undegraded alginic acid.

Alginic acid, as is known, is a polymer of molecular weight in excess of 25,000, having a carbohydrate type of structure in which the repetitive unit is as follows:

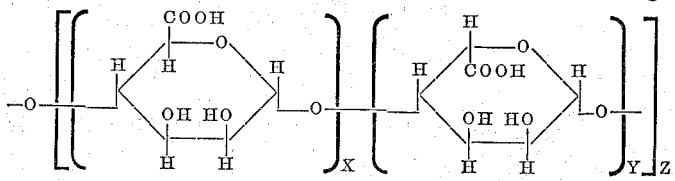

Heretofore the hydroxyl group or groups, as indicated above, have been reported in the literature as having been acetylated. Thus, reports are found in U.S. Patent 2,403,707 and in the references cited therein and in French Patent No. 767,877. However, in all of the acetylation processes for align disclosed in the literature as far as I am aware, the resulting product is degraded, that is, the molecule is depolymerized by breakage of the chain, so that the molecular weight is substantially lowered. The so-degraded product, although it may be acetylated or even highly acetylated does not have colloidal properties or it possesses colloidal properties in greatly reduced degree.

Similarly, pectic acid, which is commonly obtained from pectin by hydrolysis of the methoxy groups, has been found to be quite unreactive, especially when the reaction is to be performed in an anhydrous medium. Under very rigorous reaction conditions the material may degrade so that its colloidal properties are lost. This has been reported previously in the literature. Attempts, for example, to acetylate usually resulted in highly degraded or incompletely esterified products.

It is an object of this invention to provide acetylated alginates and pectates which are characterized by a high degree of acetylation and which retain colloidal properties and are not degraded or are degraded to only a slight degree.

Another object is to provide a method of acetylating alginic acid or pectic acid to produce an essentially non-degraded, highly acetylated product having colloidal properties.

A further object is to provide a method of acetylating alginic acid or pectic acid in which the degree of acetylation may be controlled.

Other objects of the invention will be apparent from the ensuing description and the appended claims.

As applied to acetylation of alginic acid and in accordance with an illustrative embodiment of the invention, an alginic acid of substantial purity is adjusted so as to contain a slight amount of water, preferably from 10 to 20% by weight, and is then introduced into a mixture of acetic acid and acetic anhydride. Perchloric acid is then introduced into this mixture, its function being that of a catalyst. When the perchloric acid is added, the reaction commences at an appreciable rate, with a consequent increase in temperature. I prefer to add the perchloric acid in small increments, so that the temperature of the reaction mixture does not exceed about 40° C. For the same reason, I prefer to add only about two-thirds of the calculated amount of acetic anhydride to the starting reaction mixture, and add the final one-third of the necessary acetic anhydride in small increments along with the perchloric acid. In general, the amount of acetic acid to be used is approximately 0 to 4 times that of the weight of alginic acid (dry basis) used and its function is that of a diluent. The amount of acetic anhydride is 3 to 6 times by weight of the alginic acid (same basis). This amount of anhydride will provide an excess for acetylation and also enough anhydride to react with the water present. The amount of perchloric acid necessary is from about 1% to 2% by weight of the alginic acid.

I have found that the presence of metallic salts in the alginic acid, commonly those of calcium, makes it necessary to use more perchloric acid than would otherwise be the case, so that it is more satisfactory all around to use an alginic acid which has previously been purified so that its ash content is less than 1.5% by weight, and indeed preferably in the range 0.3 to 1.0%.

In the foregoing I have mentioned that the alginic acid should contain a slight amount of water, preferably from 10 to 20% by weight. Care must be taken to see that this low amount of water remains uniformly distributed, and therefore ordinary drying methods are not desirable. In examples of my invention hereinafter set forth I show the use of glacial acetic acid as a means of reducing the moisture present in the alginic acid. In lieu thereof, I may use acetone or freeze drying as a means of reducing the moisture content of the alginic acid. Still further, solvents other than acetone may also be used for said purpose, provided however, that they do not react with the acetic anhydride.

As is well known, alginic acid contains 2 hydroxyl groups per mannuronic acid unit and is capable of salt formation by virtue of the carboxyl group which each repeating unit contains. Thus, the sodium, potassium, lithium, ammonium, and like salts of alginic acid may be made. The acetylation of alginic acid in accordance with my invention does not impair its ability to form salts in like fashion.

I have found that in order to produce useful compounds in accordance with my invention, a degree of substitution of at least 0.2 acetyl group must be bought about for each repeating unit of the algin compound. This degree of substitution is conveniently abbreviated as D.S. In the case of alginic acid, the maximum possible D.S is obviously 2.0. The maximum D.S. values obtained in my experiments are slightly below the calculated values.

Turning to the acetylation of pectic acid according to my invention the acetylation can be carried out satisfactorily after pectic acid has been activated. The activation in accordance with the invention consists of hydrating the pectic material and then removing most of the water by washing with acetic acid or other water miscible solvents. The most important factor is a complete and uniform hydration. The best way to attain this is to first precipitate pectate by the addition of calcium chloride solution to a solution of sodium pectate with strong agitation. Instead of a calcium salt, any other salts of polyvalent ions which precipitate pectate may be used, such as aluminum. The precipitate then is treated with dilute hydrochloric acid or other mineral acid in order to obtain the free pectic acid in a water slurry. It is desirable to have an ash content of as low as possible. The highly swollen, reactive pectic acid obtained by this procedure then is washed with glacial acetic acid to a water content within the range of 5–15%. Other water miscible solvents may be used for reducing the concentration of water. A direct hydration of dry pectic acid is possible, but usually the granular texture can still be recognized indicating that the hydration is not uniform; the acetylation of this material is more difficult.

The reaction in accordance with the invention is carried out in an acetic acid-acetic anhydride mixture using perchloric acid as a catalyst. Acetic acid acts only as a diluent and its addition may be omitted or it may be replaced by acetic anhydride. Sulfuric acid may be used as a catalyst also, although better results are obtained with perchloric acid. The reaction may be carried out in the range of from 35–80° C. and preferably between 40–60° C. If higher, the end product will have a lower viscosity indicating some degradation. The products obtained when the reaction is permitted to go to completion have degrees of substitution (D.S.) of 1.7–1.9. When removed sooner, products with a D.S. of 0.1–1.7 may be obtained depending on the reaction time. For low D.S. products it is advantageous to use less acetic anhydride. Acetyl pectates with D.S. $\gtrsim$ 1.1 are compatible with Ca, Ba, Ni, Zn, and other divalent ions. This offers a method of roughly determining the D.S. during the reaction. For this purpose a small sample is removed, blotted on filter paper, suspended in water, and neutralized (and dissolved) by the addition of ammonium hydroxide, When a solution of calcium chloride is added it forms a precipitate if the approximate D.S. is $\lesssim$ 0.7, a heavy gel if the D.S. is approximately 0.7–1.0, a lighter gel if the D.S. is between 1.0–1.1, and no change occurs if the D.S. is ~1.1. or higher.

The degree of substitution may be determined in accordance with known procedures. I give below a suitable procedure:

*Acetyl determination*

A small sample of acetyl ammonium alginate is dried at 80° C. in vacuo over calcium chloride and sodium hydroxide for about 1 hour. 0.5 g. of the dried material is placed in a round bottom flask connected with condenser and receiving flask. Then 10 cc. of 85% phosphoric acid and 25 cc. of water are added and the flask is heated in an oil bath and kept at 150–155° C. Under these conditions the product is hydrolyzed, and the acetic acid formed is isolated at the same time by distillation. When the reaction mixture becomes slightly syrupy, 25 cc. more of water is added; this is repeated twice. After 3–4 hours the distillate is titrated with 0.1 N sodium hydroxide using phenolphthalein as indicator. The sodium hydroxide consumed is indicative of the acetic acid formed. The equivalents for 1 g. of the products with a D.S. of 1 and of 2 may be calculated and plotted on a curve against the D.S. The D.S. of the analyzed products can then readily be taken from this curve.

Of course, it is not necessary, particularly in routine manufacture, to determine the D.S. in such a precise fashion every time. It is convenient to thieve small samples from the reaction mixtures as the acetylation proceeds and make an approximate check. The D.S. can be estimated approximately by taking a test sample, blotting it on filter paper, mixing it with water and checking the consistency:

D.S.:
 0.2–0.5 _____ Pasty, but still fibrous.
 0.5–0.8 _____ Hazy paste.
 0.8–1.0 _____ Transparent paste.
 1.0–1.3 _____ Pasty, gelatinous particles.
 >1.3 _____ Rubbery.

The determinations of the D.S. of acetyl pectate were carried out in like manner by hydrolysis of the acetyl pectate in strong phosphoric acid, distillation of the acetic acid formed, and titration of the acetic acid with 0.1 N sodium hydroxide. Titration values for products with a D.S. of 1 and 2 were calculated and plotted on a curve against the D.S. The D.S. of the samples was taken from this curve.

To further illustrate my invention, there are presented the following examples in which all parts and percentages are by weight, unless otherwise indicated.

EXAMPLE I

The following is a particularly suitable method of carrying out the method of my invention. 200 g. of wet alginic acid (25% solids, 1.2% ash) was washed three times by mixing it in a Hobart mixer with 200 cc. of glacial acetic acid each time. After each washing the material was extruded. The washed material was mixed in a Hobart mixer with 200 cc. of glacial acetic acid and 200 cc. of acetic anhydride. About 0.6 cc. of perchloric acid was added in 0.05 cc. and 0.1 cc. portions during a period of 2 hours. Thus, the temperature was controlled and was not allowed to exceed 40° C. After 3 to 4 hours a test sample was removed, blotted on filter paper and mixed with water. When it formed a hazy paste free of a fibrous appearance the reaction was stopped. Most of the acetylating mixture was removed by extrusion. The solids were washed 3 to 4 times with 200 cc. of 90% isopropanol each time and pressed out.

The acetylated acid was mixed thoroughly with water and a slight excess of a solution of:

(a) ammonium hydroxide
(b) sodium carbonate
(c) sodium bicarbonate
(d) sodium hydroxide was added. The clear, very thick syrup was poured in a thin stream into acetone. The solvent was decanted and fresh acetone was added to harden the product. The salt was filtered and dried at 50° C. in the presence of an air stream. The D.S. was between about 0.5 and 0.6.

EXAMPLE II

In Example I replacing the 200 ccs. of acetic anhydride with 150 ccs., an acetylated alginate having a D.S. of about 0.2 was obtained. The test sample was semi-fibrous in appearance or pasty with a fibrous texture.

EXAMPLE III 200 g. of wet alginic acid was washed as described above and mixed with 200 cc. of glacial acetic acid and 200 cc. of acetic anhydride. Within 2 hours 0.6 cc. of perchloric acid in 0.05 cc. and 0.1 cc. portions and 20 cc. more of acetic anhydride were added. After about 2 to 3 hours a test sample was blotted on filter paper and mixed with water. When it formed a hazy paste the whole reaction mixture was extruded and then washed 4 times by mixing it with 200 cc. of 90% isopropanol and pressing it out.

The ammonium and sodium salts were prepared and isolated as described in Example I. The D.S. was between 0.6 and 0.8 depending on the reaction time.

EXAMPLE IV 200 g. of wet alginic acid was washed and reacted with a mixture of 200 cc. of glacial acetic acid and 200 cc. of acetic anhydride. During a period of 2 hours 0.6 cc. of perchloric acid in 0.05 cc. and 0.1 cc. portions and 60 cc. more of acetic anhydride in 20 cc. portions were added.

(a) The reaction was stopped when a test sample in water formed a transparent paste. Then the mixture was extruded and washed 4 times with isopropanol and pressed out.

(b) The reaction was stopped when a test sample in water formed a paste containing gelatinous lumps. The product was extruded and washed 4 times with isopropanol and pressed out.

The ammonium and sodium salts were formed and isolated as described above.

Products from (a) had a D.S. of between 0.8 and 1.0, products from (b) between 1.0 and 1.3.

EXAMPLE V 200 g. of wet alginic acid was washed and reacted with a mixture of 200 cc. of glacial acetic acid and 200 cc. of anhydride. About 0.6 cc. of perchloric acid in 0.05 cc. and 0.1 cc. portions and 80 cc. more of acetic anhydride in 20 cc. portions were added within about 2 hours. After about 2 to 3 hours when a test sample in water became rubbery the reaction mixture was extruded and mixed thoroughly and washed with water until the pH of the wash water was 4–5.

The salts were prepared and separated as described above. The D.S. was between 1.3 and 1.6 depending on the reaction time.

EXAMPLE VI

Examples I–V were repeated but the acetylated acids were incorporated directly with the calculated amounts of ammonium hydroxide, sodium carbonate or sodium bicarbonate. The stiff paste which was obtained was wormed, dried at 60° C. in the presence of an air stream and milled.

It should be noticed that in accordance with my invention in the acetylation of alginic acid, it is important to add the catalyst at such a rate that the temperature does not rise above 40–45° C. and the acetylation proceeds slowly. The proper D.S. can be readily estimated and the reaction can be promptly stopped at that point best if the reaction proceeds slowly.

All products obtained as ammonium or sodium salts are soluble in water and aqueous alcohol and form viscous solutions with these solvents. The highest allowable concentration of the alcohol increases with increasing D.S. Transparent and flexible film can be made from these solutions.

EXAMPLE VII

Diacetyl alginic acid 200 g. of wet alginic acid (25% solids; 0.8% ash) was mixed with 160–200 ml. of glacial acetic acid in a Hobart mixer for 15 minutes and filtered on a Büchner funnel. This was repeated twice in order to remove most of the water. The filter cake was then suspended in a mixture of 200 ml. of acetic acid and 200 ml. of acetic anhydride. While mixing approximately 1 ml. of perchloric acid (70%) and 70–100 ml. more of acetic anhydride were added in such rate that the temperature did not exceed 40–45° C. during the following exothermic reaction. After 2–3 hours the reaction was completed. The product was filtered off again on a Büchner funnel using a rubber sheet, and as much acetylation mixture as possible was thus removed. The residue was washed by mixing with distilled water several times (to a pH of about 5), filtered and dried. The product swelled in water, alcohol and acetone.

EXAMPLE VIII

Diacetyl ammonium alginate

Instead of drying the product above it was stirred as an aqueous suspension to which a slight excess of ammonium hydroxide was added. The diacetyl ammonium alginate was precipitated by pouring the clear, viscous solution slowly into 3 to 5 volumes of acetone. The precipitate was filtered, washed with acetone and dried; yield 75 to 80 g.; the degree of acetylation was in all experiments between 1.5 and 2.0. Viscosity:

|  | Cps. |
|---|---|
| 1% in water at 27° C. | 110 |
| 1% in 90% methanol at 26° C. | 52 |
| 1% in 75–80% ethanol at 27° C., starting to gelatinize | 1100 |
| 1% in about 90% ethanol at 27° C., gelatinized but homogeneous | 2300 |

The acetyl alginate does not precipitate or gelatinize with:

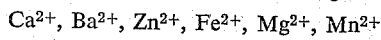

$Ca^{2+}, Ba^{2+}, Zn^{2+}, Fe^{2+}, Mg^{2+}, Mn^{2+}$

It gelatinizes with:

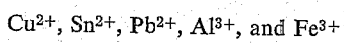

$Cu^{2+}, Sn^{2+}, Pb^{2+}, Al^{3+},$ and $Fe^{3+}$

EXAMPLE IX

Diacetyl sodium alginate

Diacetyl sodium alginate is prepared in the same way. Instead of ammonium hydroxide, sodium hydroxide is used for neutralization. An excess of strong base must be avoided. A very large quantity of acetone has to be used for the precipitation. The properties are very similar to those of diacetyl ammonium alginate.

EXAMPLE X

A 2% aqueous solution of sodium pectate was prepared and with rigorous stirring a solution of calcium chloride (2 equiv./equiv. pectic acid) was added. The precipitate was pressed out on a fine sieve, washed with dilute hydrochloric acid several times to remove the calcium, then 3 times with glacial acetic acid to reduce the water content. After each washing it was pressed out to remove as much of the liquid as possible.

Pectic acid (from 100 g. of sodium pectate) activated in this way was suspended in a mixture of 200 cc. of glacial acetic acid and 400–500 cc. of acetic anhydride. Then 2 cc. of perchloric acid was added in 0.1 cc. portions at such a rate that the reaction temperature did not exceed 50° C. After a reaction time of about 2 hours the material was pressed out and washed thoroughly with water until the wash water had a pH of 4–5. This product was suspended in water, neutralized with ammonium hydroxide, and the product precipitated by pouring the thick syrup slowly in a thin stream into acetone with thorough mixing. After filtration and hardening with more acetone it was filtered off and dried at 45° C. in the presence of an air stream.

The products prepared by the procedure above were found to have degrees of substitution of 1.7–1.9.

EXAMPLE XI

Pectic acid was activated by suspending it in water and keeping it at room temperature for 15–20 hours or at 50° C. for 5–7 hours. The removal of the water and the acetylation were carried out as described above. The D.S. of the final products varied between 1.3 and 1.6.

EXAMPLE XII

Activated pectic acid was obtained as in Example X and 100 g. (dry weight) of it was reacted in a mixture of 250–300 cc. of glacial acetic acid and 300–400 cc. of acetic anhydride. Several portions were removed during the reaction, washed with isopropyl alcohol several times, and neutralized with ammonium hydroxide. The D.S. varied between 0.6 and 1.4.

EXAMPLE XIII

This experiment was carried out as described in Example XII. However, the reaction mixture consisted of 100–150 cc. of glacial acetic acid and 150–200 cc. of acetic anhydride. Reaction products with degrees of substitution of between 0.1 and 0.6 were obtained.

EXAMPLE XIV

Instead of acetic anhydride, propionic anhydride and, in another experiment, butyric anhydride were used in a mixture with the corresponding acid in reaction with activated pectic acid. The reaction proceeded slowly, but, when the reaction was completed, degrees of substitution of 1.6–1.8 were obtained. For low D.S. products the amount of the corresponding anhydride was reduced and products with a D.S. of between 0.2 and 1.4 were obtained. The catalyst used was perchloric acid. Both reactions required more catalyst than the acetylation. When acetic acid was used as the diluent the D.S. seemed to be higher. However, this probably was due to the formation of mixed ethers, acetate-propionate and acetate-butyrate.

In accordance with a modification within the scope of my invention, I may use propylene glycol alginate as a starting material instead of alginic acid. The former is a known article of commerce, and may be made in accordance with the teachings of U.S. Patent Nos. 2,426,125, 2,463,824, 2,494,911, and 2,494,912.

While the structure of alginic acid is that given earlier hereinabove, the structure of propylene glycol alginate is as follows:

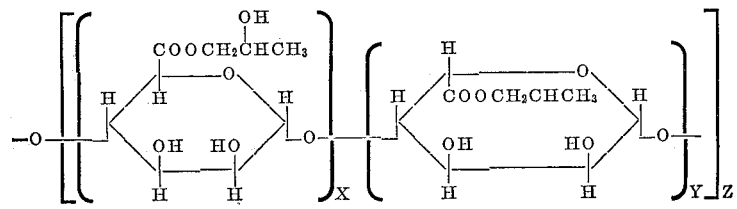

When the algin acetate in accordance with my invention is prepared, the hydroxyl groups of the algin molecule become acetylated. As will be apparent from noting the structural formulas given hereinabove, in the case of alginic acid, there are 2 such hydroxyl groups per mannuronic acid unit, while in the case of propylene glycol alginate, there are a total of 3 hydroxyl groups which may be acetylated, 2 on the ring as before, and 1 on the central carbon atom of the propane chain.

As is well known, alginic acid is capable of salt formation by virtue of the carboxyl group which each repeating unit contains. Thus, the sodium, potassium, lithium, ammonium, and like salts of alginic acid may be made. The acetylation of alginic acid in accordance with my invention does not impair its ability to form salts in like fashion. It is of interest to note that in propylene glycol alginate, the hydrogen of the carboxyl group of alginic acid is substituted, not by another ion as is the case when the sodium, potassium, etc. salts are formed, but by the $\beta$-hydroxy-propyl radical. Similarly, if the hydroxyl group of the propyl chain of propylene glycol alginate becomes acetylated in accordance with the present invention, then the radical attached to the carboxyl group may be named as the $\beta$-acetoxy-propyl radical.

EXAMPLE XV

Acetylated propylene glycol alginate 1000 g. of wet fibrous alginic acid was dried at 60° C. in the presence of an air stream and fluffed in a Raymond mill until the material contained about 55% solids. Then about 15% of the carboxyl groups was neutralized with ammonium hydroxide and the product was placed in an autoclave. It was stirred at 50° C. while about 200 cc. of propylene oxide was added in 20 cc. portions within 6 hours. After about 7 hours when the pH was 4.5 the reaction product was removed, dried at 60° C. in the presence of an air stream and milled. 50 g. of this propylene glycol alginate was suspended in a mixture of 200 cc. of acetic acid and 250–300 cc. of acetic anhydride. The mixture was agitated and 2–3 cc. of perchloric acid was added over a period of 15–30 minutes. When a clear, very viscous syrup was obtained the reaction was finished. About 200 cc. of acetone was added for dilution and the mixture was poured in a thin stream into distilled water with stirring. The fibrous precipitate was washed with distilled water until the wash water was neutral. Then it was pressed out and dried at 50° C. in the presence of an air stream. The resulting yield was approximately 77 g. and the D.S. was 2.7.

The dry acetyl propylene glycol alginate is soluble in acetone, methyl-ethyl ketone, dimethyl formamide, acetic acid, formic acid, dioxane, ethyl formate, propylene oxide, and partially soluble in ethyl acetate. It swells much in chloroform and acetonitrile and little in alcohols; it is insoluble in water, diethyl ether, benzene, ligroin and glycerol. All solutions are fairly viscous at 1% concentration. The product forms a film which is transparent, flexible and quite strong.

EXAMPLE XVI 1000 g. of wet alginic acid is acetylated as described above in Examples I–V and VII. The reaction products with a D.S. of 0.2 to 1.3 were washed with isopropanol; the ones with a D.S. of >1.3 with isopropanol or water.

The acetylated alginic acid thus obtained was dried at 40° C. in the presence of an air stream until it contained 55–60% solids. After partial neutralization with about 10 cc. of concentrated ammonium hydroxide diluted with 100 cc. of methanol, it was reacted with 200–250 cc. of propylene oxide at 45–50° C. for 6 hours. This reaction was carried out under the same conditions as the preparation of propylene glycol alginate, which is described in the first part of Example XV. The finished product was dried at 50° C. in the presence of an air stream. By this method acetylated propylene glycol alginates having a D.S. of 0.2 to 2.0 were obtained.

The acetylated propylene glycol alginate products are soluble in increasing concentrations of alcohol with increasing D.S. The derivative with a D.S. of 2.0, for example, dissolves in aqueous and non-aqueous methanol and ethanol.

It forms a strong, transparent and flexible film which softens but does not dissolve in water.

The acetyl propylene glycol alginate prepared according to the method of Example XVI has a maximum D.S.

of 2 whereas the acetylated propylene glycol alginate of Example XV has a maximum D.S. of 3 due to acetylation of the β-hydroxypropyl group. As shown, the properties of the two materials differ considerably, e.g., solubility in alcohols, as a result of their differing D.S. and methods of preparation.

The sodium and ammonium salts of the acetylated alginic acid have exceptional properties. Since they have lipophilic and hydrophilic groups in the same molecule, they are soluble not only in water but also in high concentrations of methanol and ethanol. For the same reason they have excellent emulsifying qualities. Because of their stability, good solubility and the fact that they do not react with calcium and other polyvalent ions the use of this algin derivative need not be as limited as that of many commercially available algin derivatives. Thus, it may be employed where propylene glycol alginate and sodium alginate, etc. create problems or cannot be applied at all. The good solubility in high concentrations of alcohol also makes it suitable for application in lotions and in alcoholic beverages like liqueurs, brandies, etc. to give some thickness and a smoother flow.

Acetylated propylene glycol alginate which forms a strong, transparent film and which is soluble in acetone, methyl-ethyl ketone and some other organic solvents but insoluble in water is useful for thickening organic solvents in coatings (paper or textiles), in paints, and in plastics.

The acetyl pectates prepared in accordance with my invention are excellent emulsifying agents. As an example of the utility thereof, a furniture polish formulation was prepared as follows:

|  | Percent |
| --- | --- |
| Mineral oil (light) | 45 |
| Pine oil | 2 |
| Water | 52 |
| Pectin diacetate | 1 |
|  | 100 |

In order to prepare the aforementioned polish the pectin diacetate was first dissolved in water. The mineral oil and pine oil were then admixed with the foregoing pectin solution. The resulting admixture was passed through a colloid mill at 0.0015″. The resulting product was a good creamy emulsion. It has a viscosity of 850 cps. The said resulting product had good stability.

As stated previously, the products of my invention are characterized by having a relatively undegraded molecular structure. As a result, the products have properties which differ markedly from the properties of superficially similar prior art materials. To illustrate, acetylated alginate products having a D.S. of 1.2–1.3 and produced according to U.S. Patent 2,403,707 were found to have a viscosity in a 1% aqueous solution of 9 cps. as measured by a Brookfield Viscometer, Model LVF, at 25° C. and 60 r.p.m. In contrast, an acetylated alginate having essentially the same D.S. and produced in accordance with the present invention had a viscosity of 136 cps. in a 1% aqueous solution. Further, the acetylated alginate produced according to the present invention formed a gel when a 1% aqueous solution thereof was contacted with a polyvalent $Cu^{++}$, $Pb^{++}$, $Fe^{+++}$, or $Al^{+++}$ ion. The acetylated alginate produced according to U.S. Patent 2,403,707 did not form a gel when a 1% solution thereof was contacted with any of the above mentioned ions. This difference in properties clearly demonstrates the relatively undegraded molecular structure of my products as compared with those of the prior art.

Certain of the prior art processes, notably that of U.S. Patent 2,403,707, require the use of an inert organic lipophilic solvent, i.e., benzene, to control the reaction temperature. As described previously, such a lipophilic solvent is not employed in the practice of my invention. I have found that the presence of such an organic lipophilic solvent in the reaction mixture is detrimental in that it promotes the production of a degraded product.

Without being bound by any theory, the lipophilic solvent which is miscible with the acetylating agent, e.g., acetic anhydride, is apparently attracted to the acetal linkages which have a lipophilic character. This apparently brings the acetylating agent into close proximity with the acetal linkages and thereby promotes the degradation of the polymeric structure of the starting material. In the process of my invention, the solvent employed, e.g., acetic acid, is polar in nature and is therefore, in theory, more attracted to the polar hydroxyl groups in the starting material than to the lipophilic acetal linkages. This tends to concentrate the acetylating agent, which is miscible with the solvent, in the vicinity of the hydroxyl groups and thereby promotes acetylation rather than degradation.

Whatever the theory, my process, as described previously, does not employ a lipophilic organic solvent, e.g., benzene, since its presence has been found to promote degradation of the polymeric structure of the starting materials. Moreover, the use of glacial acetic acid as a reaction solvent in conjunction with acetic anhydride as acetylating agent avoids the problem of separating solvent mixtures in the final product since reaction of acetic anhydride with the starting material produces acetic acid as a by-product.

While I have described my invention with the aid of numerous examples and specific details, reaction conditions and the like, it will be apparent that numerous variations may be made in such details, all within the scope of the invention, as set forth in the claims which follow. It will also be apparent that the improved products obtained in accordance with my invention are susceptible of many uses in varied fields of technology, other than those specifically mentioned herein.

I claim:
1. The process of esterifying pectic acid with lower fatty organic acids which comprises: hydrating said pectic acid with water by contacting said pectic acid with water; partially but not completely dehydrating said hydrated pectic acid by washing the so-hydrated substance with an organic solvent which is miscible with water to lower its water content within the range of 4% to 40%; thereafter placing the thus partially dehydrated pectic acid in a reaction mixture consisting essentially of the anhydride of the organic acid selected together with from 0% to a substantial quantity of acetic acid and with a catalyst selected from the group consisting of perchloric acid and sulfuric acid; raising said mixture to a temperature within the range 35° to 80° C.; maintaining said reaction mixture within said temperature range until esterification has proceeded to the desired extent; thereafter washing said mixture with a selective solvent to remove the said acid reagent.

2. The process of claim 1 in which the said water content of the dehydrated pectic acid is in the range of 5–15%.

3. The process of claim 1 in which reaction is carried out in the temperature range of from 40–60° C.

4. The process in accordance with claim 1 wherein said lower alkyl acid anhydride is chosen from the group consisting of acetic anhydride, propionic anhydride, and butyric anhydride.

5. The process in accordance with claim 1 wherein said organic solvent is acetic acid.

6. The product obtainable in accordance with the process of claim 1.

7. The process of esterifying pectic acid with lower fatty organic acids which comprises: preparing an alkaline earth metal pectate suspension; treating said suspension with a mineral acid to form a hydrated pectic acid suspension; separating the hydrated pectic acid suspension from the resulting solution; lowering the water content thereof within the range of 4% to 40% by treatment with a water miscible organic solvent; thereafter placing the thus partially dehydrated pectic acid in a reaction mixture consisting essentially of the anhydride of the organic acid selected together with from 0% to a substantial quantity of acetic acid and with a catalyst selected from the group consisting of perchloric acid and sulfuric acid; raising said mixture to a temperature within the range 35° to 80° C.; maintaining said reaction mixture within said temperature range until esterification has proceeded to the desired extent; thereafter washing said mixture with a selective solvent to remove the said acid reagent.

8. The process of claim 7 in which the water miscible organic solvent is acetic acid.

9. The process in accordance with claim 7 wherein said lower alkyl acid anhydride is selected from the group consisting of acetic anhydride, propionic anhydride, and butyric anhydride.

10. The process of claim 7 wherein the water content of said pectic acid is reduced to the range of 5–15% by weight of said pectic acid.

11. An acetyl alginate, having a degree of substitution of acetyl groups of at least 0.2 and ranging up to a maximum of about 2.0, and characterized further by the ability to form a gel in an aqueous solution when brought into contact with a polyvalent ion selected from the group consisting of $Cu^{++}$, $Pb^{++}$, $Fe^{+++}$, and $Al^{+++}$.

12. An acetyl alginate having a degree of substitution of acetyl groups of at least 0.2 and ranging up to a maximum of about 2.0, and characterized further by the ability to form a gel in an aqueous solution when brought into contact with a polyvalent ion selected from the group consisting of $Cu^{++}$, $Pb^{++}$, $Fe^{+++}$, and $Al^{+++}$, and in which the free valence of the carboxyl of said alginate is attached to a member chosen from the group consisting of hydrogen ion, sodium ion, lithium ion, potassium ion, ammonium ion, the β-hydroxypropyl radical, and the β-acetoxypropyl radical.

13. The alginate of claim 12 in which said member is sodium ion.

14. The alignate of claim 12 in which said member is ammonium ion.

15. The alignate of claim 12 in which said member is the β-hydroxypropyl radical.

16. The alginate of claim 12 in which said member is the β-acetoxypropyl radical.

17. Acetyl propylene glycol alignate having a degree of substitution of acetyl groups in the range of 0.2 to 3.

18. A process for acetylating an algin compound from the group consisting of alginic acid and propylene glycol alginate, said process comprising uniformly hydrating said algin compound to a water content ranging from 10 to 20% by weight, said algin compound having an ash content not in excess of about 1.5% by weight, admixing acetic acid and acetic anhydride with said hydrated algin compound to form a reaction mixture consisting essentially of said uniformly hydrated align compound and said acetic acid and acetic anhydride, adding perchloric acid incrementally to said reaction mixture, the total quantity of added perchloric acid ranging from about 1.0 to 2.0% by weight of said algin compound, maintaining the reaction temperature below about 40° C., and continuing the reaction until said algin compound is acetylated to a degree of substitution of acetyl groups of at least 0.2.

19. The process of claim 18 wherein about two-thirds of said acetic anhydride is employed in forming said reaction mixture and the remainder of said acetic anhydride is added incrementally with said perchloric acid.

20. The process of claim 19 wherein said algin compound is alginic acid.

21. The process of claim 20 wherein said alginic acid has an ash content in the range of 0.3 to 1.0% by weight.

22. The process of claim 20 wherein said acetylated algin compound is partially neutralized and then reacted with propylene oxide.

References Cited
UNITED STATES PATENTS 2,426,125  8/1947  Steiner _____ 260—209.5
2,441,729  5/1948  Steiner _____ 260—209.5

OTHER REFERENCES

Nature, Oct. 19, 1946, "Alginic Acid Diacetate" (p. 553).

Alexander, J.; Colloid Chemistry, Rheinhold Publishing Corp. (1946), p. 676.

Carson et al.; Acylation of Pectin, J.A.C.S., vol. 67, p. 787 (1945).

DONALD E. CZAJA, *Primary Examiner.*

LEON J. BERCOVITZ, *Examiner.*

R. W. MULCAHY, *Assistant Examiner.*